(12) United States Patent
Ruebush et al.

(10) Patent No.: US 11,468,523 B2
(45) Date of Patent: *Oct. 11, 2022

(54) SYSTEM AND METHOD FOR SOCIAL HOME BUYING

(71) Applicant: Capital One Services, LLC, McLean, VA (US)

(72) Inventors: Mitchell H. Ruebush, Wilmington, DE (US); Chirine Boukarroum, Dallas, TX (US); Bryan Chadwick Hobgood, Glen Allen, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 440 days.

This patent is subject to a terminal disclaimer.

(21) Appl. No.: 16/543,086

(22) Filed: Aug. 16, 2019

(65) Prior Publication Data

US 2019/0370910 A1   Dec. 5, 2019

Related U.S. Application Data

(63) Continuation of application No. 14/211,281, filed on Mar. 14, 2014, now Pat. No. 10,438,301.

(60) Provisional application No. 61/788,895, filed on Mar. 15, 2013.

(51) Int. Cl.
  *G06Q 50/00* (2012.01)
  *G06Q 50/16* (2012.01)
  *G06Q 30/06* (2012.01)

(52) U.S. Cl.
  CPC ............ *G06Q 50/01* (2013.01); *G06Q 30/06* (2013.01); *G06Q 50/16* (2013.01)

(58) Field of Classification Search
  None
  See application file for complete search history.

(56) References Cited

U.S. PATENT DOCUMENTS

| 7,934,639 | B1 | 5/2011 | Chen et al. | |
| 8,863,245 | B1* | 10/2014 | Abhyanker | G06Q 10/10 726/4 |
| 9,317,834 | B2 | 4/2016 | Horvitz et al. | |
| 2005/0288958 | A1* | 12/2005 | Eraker | G06Q 30/00 705/26.1 |
| 2007/0174090 | A1 | 7/2007 | Friedlander et al. | |

(Continued)

FOREIGN PATENT DOCUMENTS

WO   2008131496 A1   11/2008

*Primary Examiner* — Andrew B Whitaker
(74) *Attorney, Agent, or Firm* — Troutman Pepper Hamilton Sanders LLP; Christopher J. Forstner; John A Morrissett

(57) ABSTRACT

Example embodiments disclose systems and methods for providing a property profile for a property. The disclosed systems and methods enable receiving, via a network at a social home buying system, identifying data from a mobile device, receiving location data, via a network at a social home buying system, from the mobile device, retrieving property data from a property information database that stores information about the property based on the at least one of the identifying data and location data, creating a property profile based on the property data, identifying data, and location data, storing the property profile in a property profile database, and providing the property profile via a network to a social networking site.

20 Claims, 4 Drawing Sheets

(56) References Cited

U.S. PATENT DOCUMENTS

| | | | |
|---|---|---|---|
| 2007/0255581 A1* | 11/2007 | Otto | G06Q 30/06 |
| | | | 705/316 |
| 2010/0063829 A1* | 3/2010 | Dupray | G06Q 50/16 |
| | | | 705/313 |
| 2011/0066561 A1* | 3/2011 | Lazarre | G06Q 30/0202 |
| | | | 705/313 |
| 2011/0087608 A1* | 4/2011 | Shah | G06Q 10/06 |
| | | | 705/306 |
| 2012/0166433 A1 | 6/2012 | Tseng | |
| 2012/0246024 A1* | 9/2012 | Thomas | G06Q 30/06 |
| | | | 705/27.1 |
| 2013/0031078 A1* | 1/2013 | El Daher | G06F 16/9535 |
| | | | 707/706 |
| 2013/0073387 A1* | 3/2013 | Heath | G06Q 30/02 |
| | | | 705/14.53 |
| 2013/0132488 A1 | 5/2013 | Bosworth et al. | |
| 2013/0218880 A1 | 8/2013 | McConnell et al. | |
| 2013/0325606 A1* | 12/2013 | Balduf | G06Q 30/02 |
| | | | 705/14.66 |
| 2013/0339189 A1* | 12/2013 | Minerick | G06Q 50/16 |
| | | | 705/26.41 |
| 2014/0033018 A1* | 1/2014 | Pallai | G06F 16/972 |
| | | | 715/234 |
| 2014/0222620 A1 | 8/2014 | Polston et al. | |
| 2014/0297479 A1* | 10/2014 | McCloskey | G06Q 30/0627 |
| | | | 705/26.63 |
| 2014/0316908 A1* | 10/2014 | Kalra | G06F 16/248 |
| | | | 705/26.4 |
| 2014/0337938 A1* | 11/2014 | Abhyanker | G06Q 50/01 |
| | | | 726/5 |
| 2015/0302488 A1 | 10/2015 | Wilson et al. | |

\* cited by examiner

SYSTEM AND METHOD FOR SOCIAL HOME BUYING

CROSS-REFERENCE TO RELATED APPLICATIONS

This application is a continuation, under 35 U.S.C. § 120, of U.S. patent application Ser. No. 14/211,281, filed Mar. 14, 2014, which claims priority to, and the benefit under 35 U.S.C. § 119(e) of, U.S. Provisional Patent Application No. 61/788,895, filed on Mar. 15, 2013, the entire contents of which are incorporated herein by reference.

FIELD OF THE DISCLOSURE

The present disclosure relates to systems and methods for creating and sharing property profiles.

BACKGROUND OF THE DISCLOSURE

Currently, the process of buying or renting a home is largely dependent on realtors, buyer's agents, and mortgage brokers. A potential home buyer or renter is limited in the ways he or she can interact with other potential home buyers to share information, particularly with friends and acquaintances in the home buyer's social networks.

These and other drawbacks exist.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

The following description is intended to convey a thorough understanding of the embodiments described by providing a number of specific example embodiments and details involving systems and methods for facilitating social home-buying. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. A financial institution and system supporting a financial institution are used as examples for the disclosure. The disclosure is not intended to be limited to financial institutions only.

The example embodiments disclosed herein are directed to systems and methods for facilitating social home buying for an individual or individuals. The individual or user may be an account holder at a financial institution. According to the various embodiments of the present disclosure, a user interface processor may receive one or more images of a home or property from a user's mobile device via a network. The user may have previously taken pictures of a home. The home may be offered for sale. The user interface processor may receive identifying information associated with the home, such as an address. The user interface processer processor may receive location information from the user. A home buying processor may use the received information to retrieve additional data about the home or the property or the location of the property. The home buying processor may access one or more Multi-Listing Services (MLS) based on the information provided by the user and retrieve additional data. The home buying processor may create a property score based on the retrieved information. The home buying processor also may allow the user to upload the home image to his or her social networking site along with the property score and retrieved data. The home buying processor may create a property profile associated with the user's one or more social networking accounts and/or financial accounts. The home buying processor may allow the user to compare the property profile with one or more other property profiles. The home buying processor may receive comment and voting data from the user's social networking friends related to the property profile. Examples of social networking sites include, without limitation, Facebook, MySpace, Google+, LinkedIn, Instagram, Twitter, Pintrest, and the like.

Figure 1:
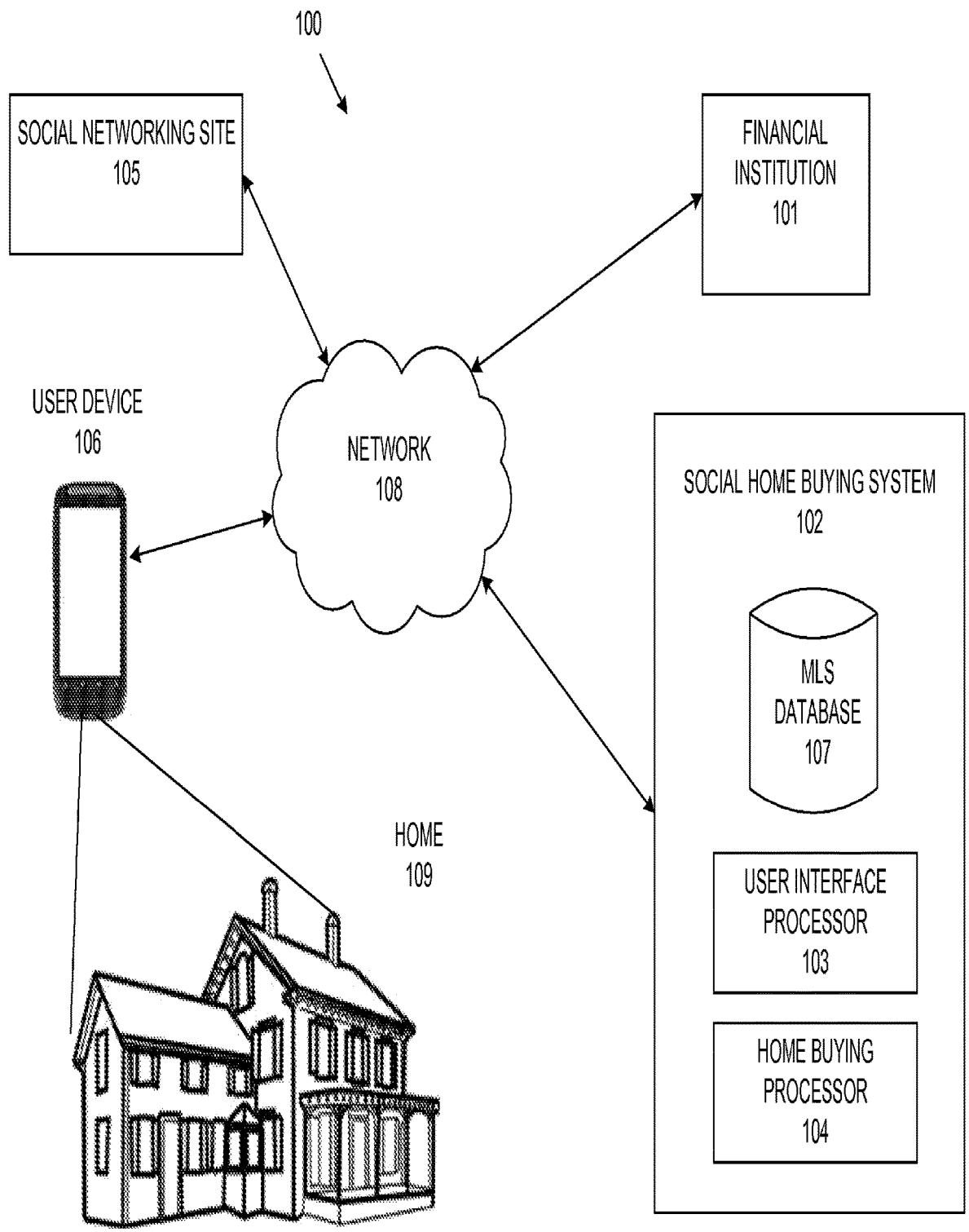
FIG. 1 depicts a schematic diagram of a system for facilitating social home-buying according to an example embodiment of the disclosure.

FIG. 1 depicts an example embodiment of a system 100 for facilitating social home buying. The system may include various network-enabled computer systems, including, as depicted in FIG. 1 for example, a financial institution 101; a social home buying system 102 comprising a user interface processor 103, a home buying processor 104, and an associated database 107 (e.g., MLS database); and a social networking site 105, which may be included as separate processors or combined into a single processor or device having the multiple processors. As shown in FIG. 1, social home buying system 102 may be separate from financial institution 101 and social networking site 105. System 102 also may be integrated into financial institution 101. Other example embodiments may disclose system 102 as being integrated into social networking site 105. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. The one or more network-enabled computer systems may also include one or more software applications to enable the creation of one or more property profiles, as described herein.

The components depicted in FIG. 1 may store information in various electronic storage media, such as, for example, database 107. Database 107 maybe, for example, a MLS database and may include information gathered from one or more Multi-Listing Services. Electronic information, files, and documents may be stored in various ways, including, for example, a flat file, indexed file, hierarchical database, relational database, such as a database created and maintained with software from, for example, Oracle® Corporation, Microsoft® Excel file, Microsoft® Access file, or any other storage mechanism. As shown in FIG. 1, database 107 may be a component of home buying system 102. Database 107 also may be a third-party database that home buying system 102 can access.

The components depicted in FIG. 1 may be coupled via one or more networks, such as, for example, network 108. Network 108 may be one or more of a wireless network, a wired network or any combination of wireless network and wired network. For example, network 108 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal.

In addition, network 108 may include, without limitation, telephone lines, fiber optics, IEEE Ethernet 902.3, a wide area network ("WAN"), a local area network ("LAN"), or a global network such as the Internet. Also network 108 may support an Internet network, a wireless communication network, a cellular network, or the like, or any combination thereof. Network 108 may further include one network, or any number of the example types of networks mentioned above, operating as a stand-alone network or in cooperation with each other. Network 108 may utilize one or more protocols of one or more network elements to which they are communicatively coupled. Network 108 may translate to or from other protocols to one or more protocols of network devices. Although network 108 is depicted as a single network, it should be appreciated that according to one or more embodiments, network 108 may comprise a plurality of interconnected networks, such as, for example, the Internet, a service provider's network, a cable television network, corporate networks, and home networks.

In various example embodiments, a user may be an account holder with a financial institution. An account holder may be any individual or entity that desires to conduct a financial transaction using one or more accounts held at one or more financial institutions. Also, an account holder may be a computer system associated with or operated by such an individual or entity. An account may include any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, or mobile commerce account. A financial institution may be, for example, a bank, other type of financial institution, including a credit card provider, for example, or any other entity that offers accounts to customers. An account may or may not have an associated card, such as, for example, a credit card for a credit account or a debit card for a debit account. The account card may be associated or affiliated with one or more social networking sites, such as a co-branded credit card. An account holder also may be an account holder with a social network.

As used herein, the term mobile device may be, for example, a handheld PC, a phone, a smartphone, a PDA, a tablet computer, or other device. The mobile device may include Near Field Communication (NFC) capabilities, which may allow for communication with other devices by touching them together or bringing them into close proximity. Example NFC standards include ISO/IEC 18092:3004, which defines communication modes for Near Field Communication Interface and Protocol (NFCIP-1). For example, a mobile device may be configured using the Isis Mobile Wallet™ system, which is incorporated herein by reference. Other example NFC standards include those created by the NFC Forum.

As described in reference to FIG. 1, financial institution 101 may provide a user 106 with one or more financial accounts. The financial account may be associated with the account holder's one or more mobile devices. Account holder may be able to access one or more accounts at financial institution 101 using mobile device 106. Account holder may be able to access one or more social networking accounts at social networking site 105 using mobile device 106.

With reference to FIG. 1, user 106 may want to create one or more property profiles based on home 109. For example, the user may be out looking at available properties to purchase and/or rent. The user may encounter or locate home 109. The user may, for example, take a picture of home 109, using one or more cameras associated with, for example, mobile device 106. The user may upload the one or more pictures to social home buying system 102 via network 108. User interface processor 103 may provide a graphical user interface (GUI) or application programming interface (API) where the user can upload the one or more pictures. The application may be provided on a website hosted by financial institution 101, or social networking site 105. The application may be provided as a native mobile application on user device 106.

User interface processor 103 may create one or more property profiles associated with home 109 based on the received one or more images. User interface processor 103 may receive other identifying information from the user via user device 106. This information may be provided via, for example, location services enabled by mobile device 106. For example, the location services may provide GPS coordinate information to user interface processor 103 and.or home buying processor 104. Identifying information may include a physical address associated with the home 109 or property where the home is located. Identifying information may include the type of dwelling, such as, for example, a single-family dwelling, condominium, apartment, beach house. Identifying information may include the sale price and/or rental price for home 109. Identifying information may include added features (e.g., pool, clubhouse, gated community, sun-room, attached garage). Identifying information may include contact information for a realtor or homeowner associated with home 109. Identifying information may include additional pictures, images, and/or videos taken of home 109.

As discussed above, user interface processor 103 may receive location data from mobile device 106. The location data may be GPS coordinates acquired by the user's mobile device 106. The location data may be an address entered by the user into the mobile device 106. The address may be a street, city, zip code, state, country, etc. The location data may be the physical address of the home 109.

Home buying processor 104 may be configured to retrieve additional data relating to home 109 based on the identifying information and location data received by user interface processor 103. Home buying processor 104 may retrieve this data from MLS database 107. MLS database 107 may be comprised of data gathered from one or more Multiple Listing Services (MLS). A Multiple Listing Service may include publicly available, searchable information on available properties. A Multiple Listing Service may include private information made available to real estate brokers and home buyers' agents. MLS data may include location, type of property (single family, lease, vacant land, duplex), property features (number of bedrooms and bathrooms), price ranges, flood plain data, school ratings, proximity to stores and restaurants, and other relevant information. MLS data may include images and/or videos of the property. MLS data may be provided by a third party. MLS database 107 may be a collection of databases. MLS data may include information previously provided by other users. MLS database 107 may be maintained by financial institution 101, social networking site 105, a third party site, or a combination of these.

Home buying processor 104 may compare the identifying data and location data received from user device 106 with data stored in MLS database 107. Home buying processor 104 may present the MLS data to user 106 via user interface 103 in order that user 106 can confirm the accuracy of the MLS data.

Home buying processor 104 may create a property profile of home 109 based on the received images, identifying data, location data, and MLS data. The property profile may be presented as an API that a user can view, edit, and save on his mobile device 106. The property profile may be presented on a website hosted by, for example, financial institution 101 or social networking site 105, or hosted by a third party. The user may view the property profile by accessing a password protected account with the social networking site 105. The user may view the property profile by accessing a password protected account with financial institution 101, or with some other third-party. The user may view the property profiles using a mobile application on mobile device 106.

The property profile for home 109 may include one or more images from mobile device 106 that user took of home 109. The property profile may include location data, such as the street address of the property where home 109 is located. The property profile may include MLS data, such as the type of dwelling (single-family dwelling, duplex, condominium, apartment, beach house, etc.). The property profile may include the price range for home 109. The property profile may include added features (e.g., pool, clubhouse, gated community, sun-room, attached garage) for home 109. The property profile may include features (number of bedrooms and bathrooms), flood plain data, school ratings, proximity to stores and restaurants, and other relevant information.

Home buying processor 104 may be configured to aggregate the received and retrieved data to determine a property score for the property profile. Home buying processor 104 may ask the user to rank information categories in order of importance (e.g., type of home, price, location, proximity to landmarks, proximity to schools, rental, etc.). Home buying processor 104 may determine a property score using the user category rankings Home buying processor 104 may determine a property score based on the rankings/votes supplied by a plurality of users. Home buying processor may allow the user to share the property profile with his friends using social networking site 105. The property profile may be hosted at social networking site 105. The property profile may be hosted at a website operated by financial institution 101. The property profile may be hosted by a third-party provider. The property profile may be searchable based on the location data, identifying information, images, and/or MLS data associated with the property profile. Financial institution 101 may associate the property profile with one or more of the user's payment accounts. Home buying processor 104 may associate the user's property profile with the user's one or more social networking accounts at social networking site 105. Home buying processor 104 also may provide the user's property profile to financial institution 101 to enable financial institution to make, for example, lending decisions related to a mortgage for the property associated with the property profile and/or other like properties.

Home buying processor 104 may receive one or more comments from the user's friends on social networking site 105, based on the property profile. The user's friends may be able to vote for or "like" the user's one or more property profiles. The home buying processor 104 may update the property profile's property score based on comments, votes, likes, and other feedback data received from the user's friends and associates through social networking site 105 or other sites where the property profile is shared. Home buying processor 104 may allow users to view multiple property profiles simultaneously and compare different features.

Home buying processor 104 may create a listing of one or more property profiles that may be linked based on shared characteristics. The property profiles may be linked based on similarities in location data. For example, property profiles may be linked based on common street, city, state, zip code, country, or other relevant geographic data. Property profiles may be linked based on similarities in price range. Property profiles may be linked based on similarities in property type. Property profiles may be linked based on associations between the users that supplied the identifying information for the property profiles. If a group of users are friends on social networking site 105, their respective property profiles may be linked based on those friend relationships.

For example, home buying processor 104 may be configured to allow a user to search for property profiles associated with other users who attended the same college. This education information may have been previously associated with a user's social networking account and/or with a payment account. So, for example, if a user attended the University of Richmond, he may be able to search for one or more property profiles associated with other users who attended the University of Richmond. The search may be performed using user interface processor 103. The search may be performed by home buying processor 104.

Home buying processor 104 may be configured to allow a user to search for property profiles within a certain distance of a popular restaurant, park, business, historical landmark, etc. To do so, home buying processor 104 may enable access to various information associated with the various establishments. For example, home buying processor 104 may enable access to maps, social network, and other information that may describe and locate the reference establishment and provide parameters for the search.

Home buying processor 104 may provide notifications to a user via device 106 when the user is within a certain distance of a property associated with a property profile. The notification may be provided based on a comparison between the location data associated with the current location of user's mobile device 106 and the location data/identifying data/MLS data associated with one or more property profiles. A notification may be an email, text message, SMS, Facebook message, Tweet, or other form of electronic communication to notify the user of his proximity to one or more properties with associated property profiles—(e.g., "You are ½ mile from a two-bedroom apartment for rent in the West End, recommended by Joe Smith."). The notification may include identifying information, images, and/or MLS data associated with the property profile. The notification may include the name of the user who posted the property profile. The notifications may be in real-time and/or may be in advance of the event. For example, the notification may indicate that within 5 minutes, the a user will be passing a property for sale that is recommended by Joe Smith. To provide such notification, home buying processor 104 may coordinate with GPS data on a mobile device.

Transmitting, receiving, and storing the images, location data, identifying data, financial data, and MLS data may be accomplished using systems and methods for securely storing and transferring data, such as various encryption and decryption methods.

It should be appreciated that the foregoing discussion related to FIG. 1 is illustrative only, and that the various embodiments of the disclosure may be implemented by any other appropriate system or method.

Figure 2:
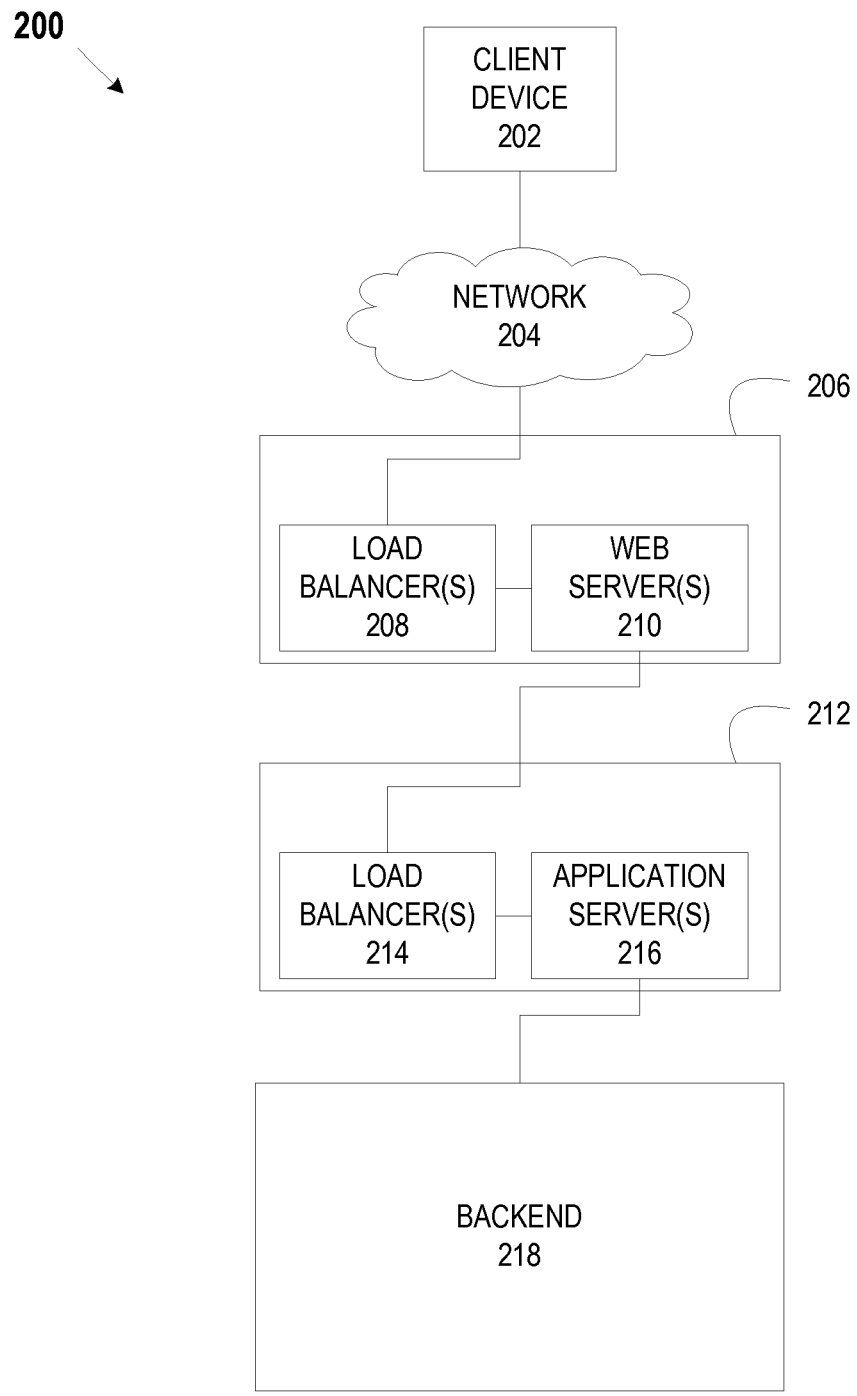
FIG. 2 depicts a schematic diagram of a system for facilitating social home-buying according to an example embodiment of the disclosure.

For example, the various embodiments of the disclosure also may be implemented using the system shown and described in FIG. 2. FIG. 2 depicts an example system 200 that may enable a financial institution, for example, to provide network services to its customers. For example, system 200 may provide social home buying services to users of system 200. In various embodiments, system 200 may enable interaction between a user of a mobile device and a home buying system and/or the user and a social network. As shown in FIG. 2, system 200 may include a client device 202, a network 204, a front-end controlled domain 206, a back-end controlled domain 212, and a backend 218. Front-end controlled domain 206 may include one or more load balancers 208 and one or more web servers 210. Back-end controlled domain 212 may include one or more load balancers 214 and one or more application servers 216.

Client device 202 may be a network-enabled computer. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

Client device 202 also may be a mobile device. For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 204 may be one or more of a wireless network, a wired network, or any combination of a wireless network and a wired network. For example, network 204 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN) or a global network such as the Internet. Also, network 204 may support an Internet network, a wireless communication network, a cellular network, or the like, or any combination thereof. Network 204 may further include one network, or any number of example types of networks mentioned above, operating as a stand-alone network or in cooperation with each other. Network 204 may utilize one or more protocols of one or more network elements to which they are communicatively couples. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks.

Front-end controlled domain 206 may be implemented to provide security for backend 218. Load balancer(s) 208 may distribute workloads across multiple computing resources, such as, for example computers, a computer cluster, network links, central processing units or disk drives. In various embodiments, load balancer(s) 210 may distribute workloads across, for example, web server(s) 216 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 may include software that monitoring the port where external clients, such as, for example, client device 202, connect to access various services of a financial institution, for example. Load balancer(s) 208 may forward requests to one of the application servers 216 and/or backend 218 servers, which may then reply to load balancer 208. This may allow load balancer(s) 208 to reply to client device 202 without client device 202 ever knowing about the internal separation of functions. It also may prevent client devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., client device 202) through a network (e.g., network 204), such as the Internet. In various examples, web servers, may deliver web pages, relating to, for example, online banking applications and the like, to clients (e.g., client device 202). Web server(s) 210 may use, for example, a hypertext transfer protocol (HTTP or sHTTP) to communicate with client device 202. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 210 may respond with the content of that resource or an error message if unable to do so. The resource may be, for example a file on stored on backend 218. Web server(s) 210 also may enable or facilitate receiving content from client device 202 so client device 202 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a financial institution or other entity implementing system 200, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 216 may behaves like an extended virtual machine for running applications, transparently handling connections to databases associated with backend 218 on one side, and, connections to the Web client (e.g., client device 202) on the other.

Backend 218 may include hardware and/or software that enables the backend services of, for example, a financial institution or other entity that maintains a distributes system similar to system 200. For example, backend 218 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and the like. Backend 218 may be associated with various databases, including account databases that maintain, for example, customer account information, product databases that maintain information about products and services available to customers, content databases that store content associated with, for example, a financial institution, and the like. Backend 218 also may be associated with one or more servers that enable the various services provided by system 200. For example, backend 218 may be associated with a social network (e.g., social networking site 105) and provide social networking service and/or social home buying system (e.g. social home buying system 102) and provide social home buying services. Backend 218 also may maintain and/or enable access to various databases including, for example, a MLS database.

Figure 3:
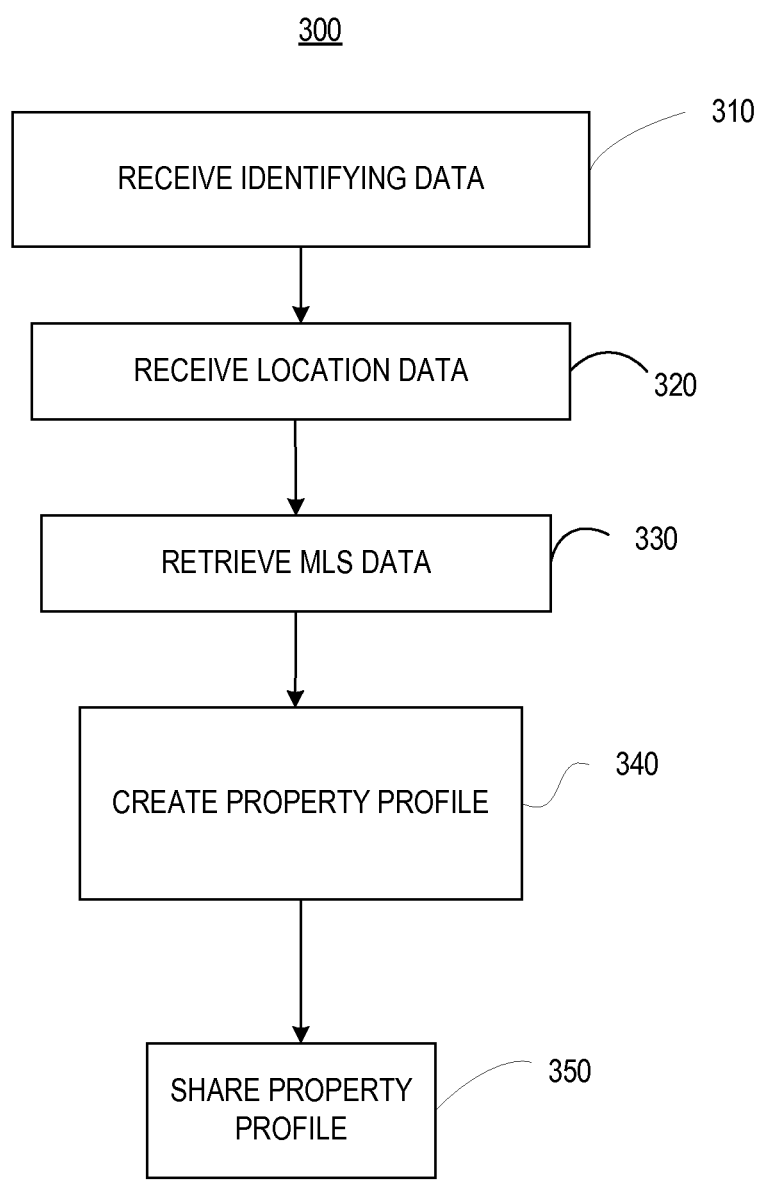
FIG. 3 is a flow chart illustrating a method for creating a property profile to a user.

FIG. 3 is a flow chart illustrating a method for creating a property profile. This example method is provided by way of example. The method 300 shown in FIG. 3 can be executed or otherwise performed by one or more combinations of various systems. The method 300 as described below may be carried out by the systems for facilitating social home buying as shown in FIGS. 1 and 2, by way of example, and various elements of that system are referenced in explaining the method of FIG. 3. Each block shown in FIG. 3 represents one or more processes, methods, or subroutines in the example method 300. Referring to FIG. 3, the example method 300 may begin at block 310.

In block 310, method 300 may include receiving identifying data. The identifying data may be associated with one or more physical properties. The properties may be for sale or for rent. The identifying data may include one or more images, pictures, or videos of the properties. The images, pictures, or videos may have been taken or recorded by a user using his mobile device. The images, pictures, or videos may have been taken of the exterior and/or interior of the structure on the property. The identifying data may include the address of the one or more properties. The identifying data may include the type of dwelling, such as a single-family dwelling, condominium, apartment, beach house. Identifying information may include sale and/or rental price. Identifying information may include added features (e.g., pool, clubhouse, gated community, sun-room, attached garage). Identifying information may include contact information for a realtor, homeowner, or landlord associated with the property. The identifying information may be inputted by a user using his mobile device 106 via a user interface module 103.

For example, user A may be walking through his neighborhood on Grove Avenue, and walk past a two story home for sale at 4300 Grove Avenue for $250,000. User A may take one or more pictures of the home using his iPhone or other like mobile device (e.g., mobile devices similar to client device 202) and upload them to a social home buying system (e.g. a social home buying system 102) using a mobile application on his iPhone. User A may include the street address for the home, the listed price ($250,000), the type of home (single-family dwelling in this case), and other relevant information. User A also may use location services associated with his mobile device to provide the street address to be included. This information then may be transmitted to, for example, a user interface processor of a home buying system so that it may be received by the home buying system. Method 300 may continue at block 330.

In block 330, method 300 may receive location data. The location data may be received from the user's mobile device, such as device 106 shown in FIG. 1. Location data may be GPS-data. The location data may be a physical address, such as a street, city, state, zip code, or other address-related information. Location data may be received by user interface processor 103, shown in FIG. 1. Location data may be associated with identifying data received in step 310.

Continuing with the previous example, social home buying system 102 may receive location data from user A's iPhone. The location data may be GPS-coordinates that denote user A's location. User A may send the location data to social home buying system 102 using the mobile application in response to one or more prompts. The mobile application associated with, for example, a social home buying system may automatically retrieve the location data from user A's iPhone. The location data may be associated with the identifying data previously received. Method 300 may continue at block 330.

In block 330, method 300 may include retrieving MLS data. The MLS data may be retrieved based on the received location data and identifying data. MLS data may be data stored in one or more Multiple Listing Services. A Multiple Listing Service may include publicly available, searchable information on available properties. A Multiple Listing Service may include private, non-public, or inaccessible to the public information made available only to real estate brokers and home buyers' agents. MLS data may include location, type of property (single family, lease, vacant land, duplex), property features (number of bedrooms and bathrooms), price ranges, flood plain data, school ratings, proximity to stores and restaurants, and other relevant information. MLS data may include images and/or videos of property. MLS data may be provided by a third party. MLS data may be stored in, for example, MLS database 107. MLS data may be provided by financial institution 101, social networking site 105, a third party site, or a combination of these.

For example, with reference to FIGS. 1 and 2, home buying processor 104 (which may be associated with a backend system such as, e.g., backend 218) may compare the identifying data and location data received from user A's iPhone with data stored in one or more Multiple Listing Services. Home buying processor 104 may search for MLS data associated with the single-family dwelling at 4300 Grove Avenue. Home buying processor 104 may retrieve MLS data that is similar to or matches the identifying information and/or location data received from user A's mobile device. Method 300 may proceed to block 340.

At block 340, method 300 may create one or more property profiles based on the received images, identifying data, location data, and MLS data. The property profile may be presented as an API and/or GUI that the user can view, edit, and save on his mobile device. The property profile may be presented on a website hosted by financial institution 101 or social networking site 105, or hosted by a third party. The user may view the property profile by accessing a password protected account with the social networking site 105. The user may view the property profile by accessing a password protected account with financial institution 101, or with some other third-party. User A may view the property profiles using a mobile application on mobile device 106.

Continuing with the previous example, the social home buying system 102 may create a property profile for user A of the single-family home at 4300 Grove Avenue. The property profile may be presented via an application on user A's iPhone or like mobile device. The property profile may include one or more pictures, images, or videos that user A recorded of the house. The property profile may include the price. The property profile may include the identifying data, location data, and/or MLS data. The property profile may include information about nearby schools, restaurants, parks, popular attractions, shopping centers, sport's venues, movie theaters, and other relevant local attractions. This information may be retrieved from, for example, the MLS data, social networking data and/or map data which may be utilized by a home buying system to, for example, create a property profile. The property profile may include one or more images, pictures, and/or videos taken or recorded by third parties. Home buying processor 104 may determine a property score based on the data and associate the property score with the property profile. Method 300 may proceed to block 250.

At block 250, method 300 may share the property profile on a social networking site. Home buying processor 104 may automatically post the property profile to one or more social networking sites where the user has a social networking account. The home buying processor 104 may post the property profile to a site hosted by financial institution 101. Home buying processor 104 may post the property profile to a social networking site in response to one or more commands from the user via a mobile or other client device.

Once a property profile has been shared on a social networking site, a user's friends and acquaintances on the social networking site may be able to view, comment on, "like," and vote on the shared property profile. Home buying processor 104 may receive this information and update the property profile based on the received feedback from friends and acquaintances. Home buying processor may update the property score associated with the property profile based on the received feedback data.

Continuing with the previous example, home buying processor 104 and/or user interface processor 103 may allow user A to share the property profile with his friends on one or more social networking sites. User A may link the property profile to his Facebook page and choose to share it with his friends. User A's friends may comment on the property profile. They may vote on or "like" the property profile. They may vote against or "dislike" the property profile. This information may be collected and/or analyzed by home buying processor 104, or user interface processor 103, or the social networking site, and/or the financial institution where user A may have one or more financial accounts, or a combination of the above. This social data may be used to update the property score associated with the property profile. User A's friends, for example, may be able to compare information associated with user A's property profile with other shared property profiles. User A's property profile may be searchable by one or more other users of the social networking site.

Figure 4:
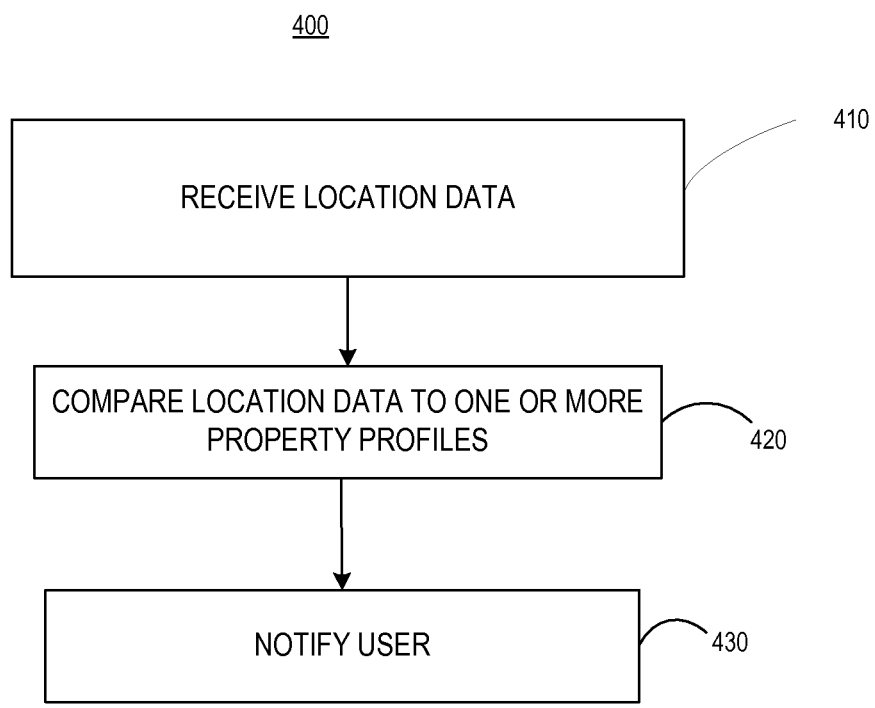
FIG. 4 is a flow chart illustrating a method for notifying a user of nearby properties based on the user's location.

FIG. 4 is a flow chart illustrating a method for notifying a user of nearby properties based on the user's current location. This example method is provided by way of example. The method 400 shown in FIG. 4 can be executed or otherwise performed by one or more combinations of various systems. The method 400 as described below may be carried out by the systems for facilitating social home buying as shown in FIGS. 1 and 2, by way of example, and various elements of that system are referenced in explaining the method of FIG. 4. Each block shown in FIG. 4 represents one or more processes, methods, or subroutines in the example method 400. Referring to FIG. 4, the example method 400 may begin at block 410.

In block 410, method 400 may receive location data. The location data may be received from a user's mobile device. The location data may be similar to the location data received in conjunction with step 330 in FIG. 3. The location data may be GPS-data. The location data may correspond to a current location of the user. The user may be an account holder with financial institution 101. The user may have a social networking profile with social networking site 105. Method 400 may continue at block 430.

In block 430, method 400 may include comparing the location data with one or more property profiles. The property profiles may be associated with individuals who are listed as friends of the user on one or more social networking sites. The user may share one or more interests in common with his friends, or with other account holders at the social networking site. The property profiles may include physical address information. The user's location data may be compared with the physical address associated with the one or more property profiles. Social home buying system 102 may determine the distance between the user's current location and the property associated with the one or more property profiles.

For example, user B may be a friend of user A's. User B may have an account with social networking site 105 or a financial account with financial institution 101. User B may have a social networking association with (e.g., Facebook friend, Twitter follower, and/or the like) with user A. User B may be driving on Broad Street. User B's location may be sent to social home buying system 102 via his smart phone. This location may be compared to the property profile for the home at 3400 Grove Avenue which user A has previously shared on his or her social network profile. Method 400 may proceed to block 340.

At block 340, method 400 may notify the user based on the comparison between the location data and the one or more property profiles. In the previous example, if social home buying system 102 determines that user B is within 1 mile of the property at 4300 Grove Avenue, social home buying system 102 may send a notification to user B's mobile device. The notification may include information associated with the property profile for 4300 Grove Avenue. The notification may be a text message, email, Tweet, Facebook message, push notification via, for example, a native application operating in conjunction with the operating system of a mobile device, SMS, or other form of electronic communication. The notification may be, for example "You are 1 mile from a two-story home at 4300 Grove Ave, recommended by Joe Smith." The notification may be sent based on the fact that user B may have previously "liked" or voted on the 4300 Grove Avenue property profile on user A's Facebook page. The notification may be sent based on common interests shared by user A and user B. The notification may include information about more than one property based on multiple property profiles. The notification may list the property profiles, starting with the one that is geographically the closest to user B's current location. The notification may list the property profiles based on their property scores.

It is further noted that the software described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

It is further noted that the systems and methods are not intended to be limited to creating property profiles that can be shared with friends and acquaintances. The same systems and methods may be configured to create profiles associated with vehicles for sale, or boats, or other items that a user is seeking to buy or sell.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A system for providing a property profile for a physical property, the system comprising:
    a social home buying system processor;
    memory storing instructions, that when executed by the social home buying system processor, cause the system to:
        create a property profile comprising (i) property data corresponding to the physical property and received from a third-party data source and (ii) property location data corresponding to a physical location of the physical property;
        automatically link the property profile to a first social networking account on a social networking site;
        aggregate social data of the first social networking account, the social data comprising user input corresponding to the property profile and received from at least some of a plurality of second social networking accounts of the social networking site, each of the plurality of second social networking accounts being different from the first social networking account;
        automatically update the property profile to include the aggregated social data;
        receive user location data from a mobile device, the mobile device being associated with a user of at least one of the plurality of second social networking accounts;
        determine a proximity between the mobile device and the physical property based on a comparison of the user location data of the mobile device to the property location data;
        generate a customized location-based notification, via the social home buying system processor and within a graphical user interface (GUI), based on the proximity between the mobile device and the physical property, the customized location-based notification comprising an indication that the user previously contributed at least a portion of the social data corresponding to the property profile; and
        prior to the mobile device arriving at the physical property, transmit the customized location-based notification to the mobile device; and
    a property profile database configured to store the updated property profile for use by internal applications of at least one third-party system and provide the at least one third-party system direct access to the updated property profile.

2. The system of claim 1, wherein the property data comprises a photo of the physical property.

3. The system of claim 1, wherein the social home buying system processor is configured to receive social network responses corresponding to the property profile, wherein the social data comprises the social network responses.

4. The system of claim 1, wherein the property location data and the user location data each comprises global positioning system coordinate data.

5. The system of claim 4, wherein the third-party data source comprises a multiple listing services database.

6. The system of claim 1, wherein the instructions, when executed by the social home buying system processor, further cause the system to retrieve the property data from the third-party data source.

7. The system of claim 1, wherein the instructions, when executed by the social home buying system processor, further cause the system to associate the property profile with data corresponding to a nearby establishment.

8. The system of claim 7, wherein the instructions, when executed by the social home buying system processor, further cause the system to determine, based on the property location data, whether the physical property is within a threshold distance from the nearby establishment.

9. The system of claim 1, wherein the customized location-based notification comprises at least one of data corresponding to a nearby establishment, whether the physical property is within a threshold distance of an establishment, a photo of the physical property, and at least some of the social data.

10. A method for providing a property profile for a physical property, the method comprising:
    creating, via a social home buying system, a property profile based on property data corresponding to the physical property and received from a third-party data source, and property location data corresponding to a physical location of the physical property;
    automatically linking, via a network, the property profile to a first social networking account on a social networking site;
    aggregating social data that is associated with one or more second social networking accounts and corresponds to the property profile;
    automatically updating the property profile to include the aggregated social data;
    receiving user location data via the network and from a mobile device associated with a user of an account of the one or more second social networking accounts;
    determining, by the social home buying system, a proximity between the mobile device and the physical property based on a comparison of the user location data of the mobile device to the property location data;
    generating a customized location-based notification, by the social home buying system and within a graphical user interface (GUI), based on the proximity between the mobile device and the physical property, the customized location-based notification comprising an indication that the user previously contributed at least a portion of the social data corresponding to the property profile; and
    transmitting, via the network, the customized location-based notification to the mobile device.

11. The method of claim 10, wherein the property data comprises a photo of the physical property.

12. The method of claim 10 further comprising receiving, via the network and at the social home buying system, social network responses corresponding to the property profile, wherein the social data comprises the social network responses.

13. The method of claim 10, wherein the property location data and the user location data each comprises global positioning system coordinate data.

14. The method of claim 13 further comprising receiving the property location data from a computing device, the property location data corresponding to a current location of the computing device that is at or near the physical location of the physical property.

15. The method of claim 10, wherein the third-party data source comprises a multiple listing services database.

16. The method of claim 10 further comprising retrieving the property data from the third-party data source.

17. The method of claim 10, further comprising associating, using the social home buying system, the property profile with data corresponding to a nearby establishment.

18. The method of claim 17, further comprising determining, based on the property location data, whether the physical property is within a threshold distance from the nearby establishment.

19. The method of claim 10, wherein the customized location-based notification comprises at least one of data corresponding to a nearby establishment, whether the physical property is within a threshold distance of an establishment, a photo of the physical property, and at least some of the social data.

20. A social home buying platform comprising:
    a social home buying system processor;
    memory storing instructions, that when executed by the social home buying system processor, cause the social home buying system processor to:
        create a property profile based on property data and property location data, the property data being associated with a physical property and the property location data indicating a physical location of the physical property;
        automatically link the property profile to a social networking account of a social networking platform;
        receive social data from one or more linked accounts of the social networking platform, each of the one or more linked accounts being linked to the social networking account via the social networking platform;
        automatically update the property profile to include the received social data;
        receive mobile device location data from a mobile device associated with a user of at least one of the one or more linked accounts;
        responsive to determining that the mobile device location data indicates a location that is within a predetermined distance from the physical location of the physical property, automatically generate, via a graphical user interface (GUI), a customized notification comprising at least some of the property profile and an indication that the user previously contributed at least a portion of the social data; and
        transmit the customized notification to the mobile device.

* * * * *